United States Patent [19]
Kramer

[11] Patent Number: 4,559,562
[45] Date of Patent: Dec. 17, 1985

[54] MICRODEFLECTOR FACET TRACKER FOR SCANNING SYSTEM

[75] Inventor: Charles J. Kramer, Pittsford, N.Y.

[73] Assignee: Xerox Corporation, Stamford, Conn.

[21] Appl. No.: 523,982

[22] Filed: Aug. 16, 1983

[51] Int. Cl.$^4$ .................. H04N 1/04; H04N 1/29; H04N 3/08
[52] U.S. Cl. .................... 358/208; 358/302; 358/293
[58] Field of Search ............. 358/206, 208, 294, 293, 358/300, 302, 285

[56] References Cited

U.S. PATENT DOCUMENTS

| | | | |
|---|---|---|---|
| 3,758,187 | 9/1973 | Thomas et al. | 350/3.5 |
| 3,829,192 | 8/1974 | Wheeler | 350/7 |
| 3,916,158 | 10/1975 | Sansone et al. | 235/61.11 E |
| 3,944,323 | 3/1976 | Starkweather | 358/206 |
| 4,281,904 | 8/1981 | Sprague et al. | 350/356 |
| 4,320,420 | 3/1982 | Rider | 358/206 |
| 4,441,126 | 4/1984 | Greenig | 358/206 |
| 4,450,458 | 5/1984 | Araghi | 358/293 |

OTHER PUBLICATIONS

Applied Physics Letters, vol. 31, No. 8, Oct. 15, 1977, K. E. Petersen, pp. 521-523.
IEEE Transactions on Electron Devices, vol. ED-25, No. 10, Oct. 1978, K. E. Peterson, pp. 1241-1249.

Primary Examiner—Howard W. Britton
Attorney, Agent, or Firm—Frederick E. McMullen

[57] ABSTRACT

A microdeflector facet tracker comprised of a flexible finger supported for bending movement on a base, the finger having a conductive highly reflective coating on the outside thereof to reflect a beam of high intensity light against the facets of a rotating scanning element, the finger progressively deflecting in response to the application of progressively increasing electrical potentials applied with each facet so that the beam is tracked with each facet as the facet moves past thereby maintaining the point at which the beam impinges against the facets substantially constant, the electrical potential being removed between each scan line to permit the finger to return to an undeflected position preparatory to the next scan line.

7 Claims, 6 Drawing Figures

MICRODEFLECTOR FACET TRACKER FOR SCANNING SYSTEM

The invention relates to a facet tracker for tracking the beam incident on the facets of a rotating scanning element, and more particularly, to an improved facet tracker in the form of a micro-deflector.

A major difficulty confronting the system designer when designing and building a high resolution, high speed Raster Output Scanner (i.e. ROS) system incorporating a polygon or holographic type scanning element for sweeping the scanning beam across an imaging or recording member results from the fact that the scanning element must rotate at high velocities. This puts a burden on both the structural strength of the scanning element itself and on related parts, i.e., the scanning element driving motor and bearing assembly, a burden which increases as a function of the square of both the scanning element's diameter and velocity. Since machine design parameters normally dictate scanning element velocities, this leaves the designer only room to reduce the scanning element's diameter if the load on the scanning element is to be decreased.

One technique employed to reduce scanning element size is facet tracking. In facet tracking, the position of the incident beam on each facet of the scanning element is changed as the scanning element rotates so that the beam tracks each facet during a scanning cycle. Under these circumstances, the scanning element facets need only be slightly larger than the incident beam size and, therefore, the scanning element size can be made much smaller than, for example, the scanning element facets used in either the underfilled facet mode when no facet tracking is performed or in the overfilled facet mode.

In an attempt to overcome the aforedescribed difficulty, some previous prior art systems have employed a combined Acousto-Optic (A/O) modulator/deflector unit to both modulate and track the incident beam. However, incorporating both functions into a single unit usually requires that the bandwidth of the A/O modulator be doubled which results in significant fabrication complexity and cost for this part. Additionally, a combined A/O modulator/deflector does not permit use of the newer diode type lasers or of Total Internal Reflection (TIR) type modulators.

The invention proposes to solve the above difficulties by providing a facet tracker for use in tracking a beam of high intensity radiation to maintain the point where the beam impinges on the facets of a rotating scanning element substantially constant, the facet tracker comprising: a base, and a flexible finger-like projection on the base bendable toward and away from the base, the outer surface of the finger-like projection having a reflective material for reflecting the beam onto the facets of a scanning element on disposition of the facet tracker in the path of the beam, the finger-like projection being adapted to deflect in response to application of an electrical bending potential so that the point at which the reflected beam impinges on the scanning element facets can be controlled by application of controlled electric bending potentials to the finger-like projection permitting the beam to be tracked and the point where the beam impinges on the scanning element facets maintained substantially constant.

The invention further provides a printer comprising, in combination: a movable recording medium; a beam of high intensity radiation for recording images on the recording medium in response to an image signal input; a rotatable scanning element having a plurality of facets interposed in the path of the beam so that the beam impinges against the scanning element facets in succession whereby the beam is repeatedly scanned across the recording medium; a facet tracker for tracking the beam to maintain the point where the beam impinges on the facets of the scanning element substantially constant, the facet tracker including a base with an elongated flexible finger having an unsupported free end spaced from the base; a reflective material on the outer surface of the finger in the path of the beam to reflect the beam onto the scanning element facets, application of an electrical potential between the reflective material and the base causing the finger free end to deflect; and means for controlling the electrical potential in synchronism with movement of the scanning element facets to provide controlled deflection of the finger free end to displace the beam and maintain the point where the beam impinges on the scanning facets substantially constant.

IN THE DRAWINGS

Figure 1:
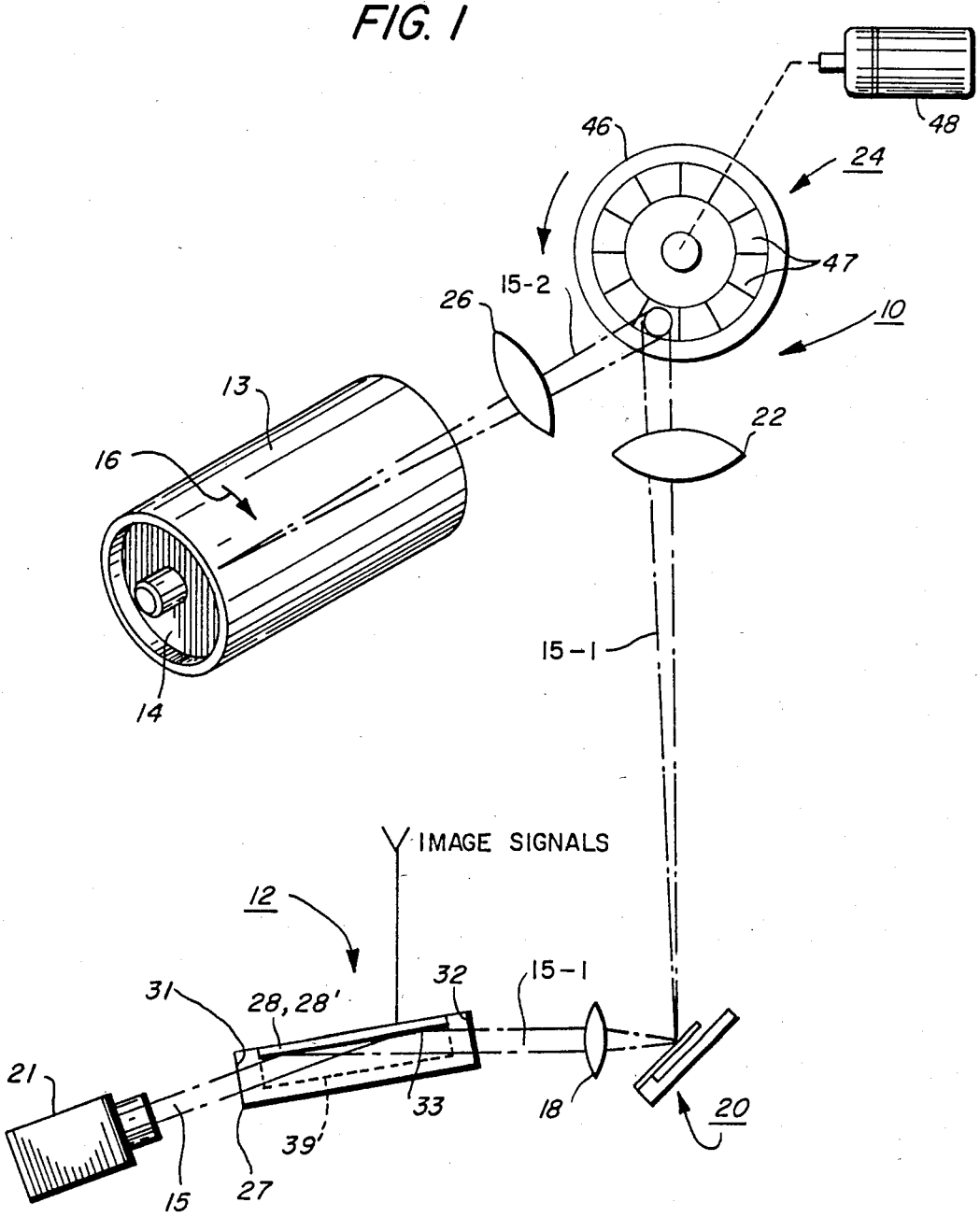
FIG. 1 is a schematic view of the micro-deflector facet tracker of the present invention embodied in a raster scanner of the type having a total internal reflection (TIR) modulator and holographic scanning disc.
Figure 2:
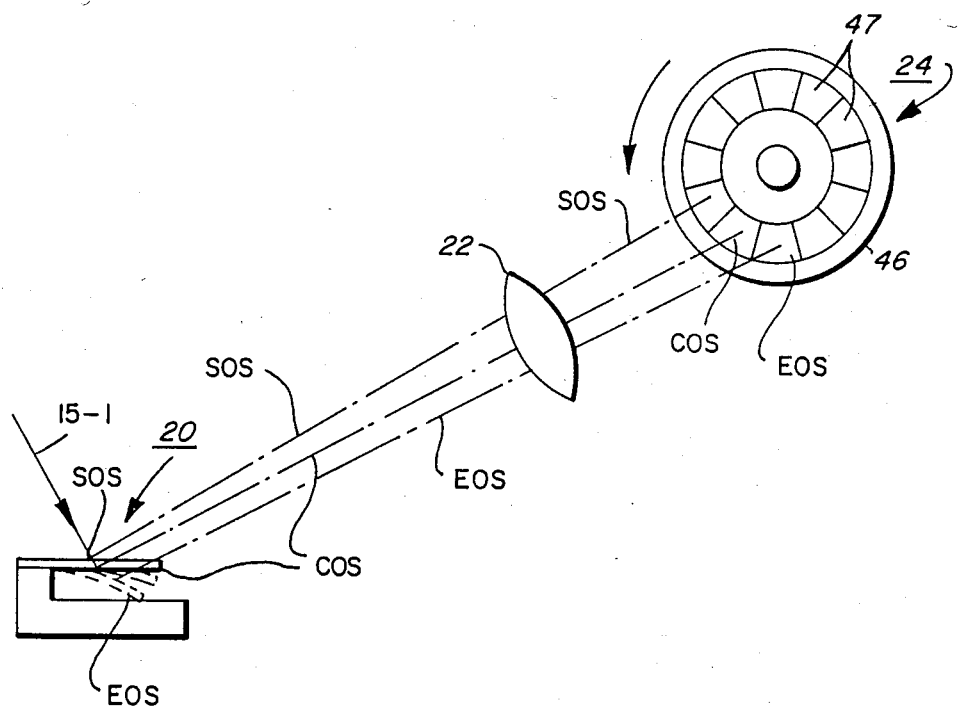
FIG. 2 is a schematic view illustrating the manner in which facet tracking is effected by the facet tracker shown in FIG. 1.
Figure 3:
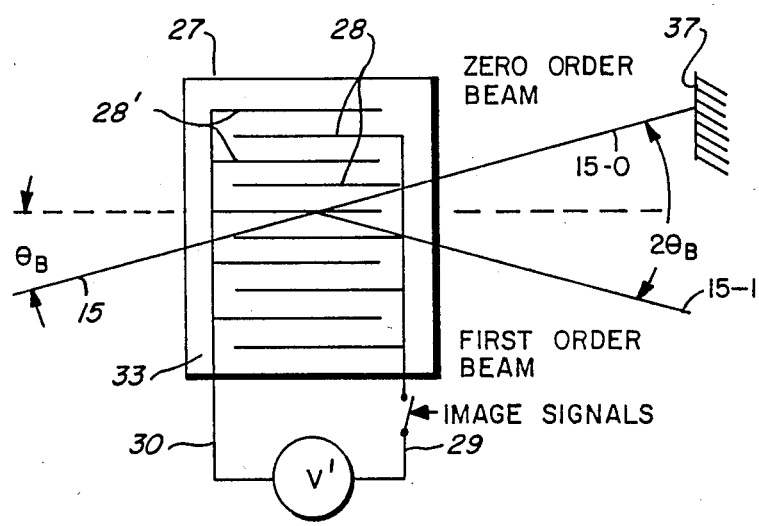
FIG. 3 is an enlarged bottom plan view showing details of the TIR modulator for the scanner shown in FIG. 1.

Referring particularly to FIGS. 1–3 of the drawings, an exemplary raster scanner, designated generally by the numeral 10, incorporating the micro-deflector of the present invention is there shown. Raster scanner 10 comprises a Raster Output Scanner or ROS type scanner wherein a beam 15 of high intensity radiation, ie, light, modulated in accordance with image signals, is scanned across a photosensitive recording medium 13 to expose the recording medium in an image configuration. The recording medium 13 is depicted as being a photoconductively coated xerographic drum 14 which is rotated (by means not shown) in the direction of arrow 16. Nevertheless, it will be understood that other xerographic and non-xerographic recording media may instead be used, including photoconductively coated xerographic belts and plates, as well as photosensitive film and coated paper in web or cut sheet stock form. Accordingly, the recording medium 13 should be visualized in the generalized case as being a photosensitive medium which is exposed while advancing in a cross line or line pitch direction relative to the scanning beam 15-2.

Beam 15 is derived from a suitable flux source of electromagnetic radiation such as laser 21. The collimated beam 15 of monochromatic radiation generated by laser 21 is impinged on a modulator 12 which modifies the beam 15 in conformance with information contained in image signals input thereto as will appear. The modulated beam 15-1 passes through a telecentric telescopic beam expander 18 to facet tracker 20 and from facet tracker 20 through a second telecentric telescopic beam expander 22 to a holographic type scanning deflector 24. From deflector 24, the beam is focused by imaging lens 26 onto the recording medium 13.

Modulator 12 is a Total Internal Reflection (ie, TIR) type modulator having an electro-optic base or element 17 with plural addressable electrodes 28, 28' distributed in succession across a portion of the electro-optic element 27 commensurate with the effective size of beam 15. Typically, the electrodes 28 are 1-30 microns wide and are on centers which are more or less equidistantly separated to provide a generally uniform interelectrode gap spacing of 1-30 microns.

Electro-optic element 27 comprises a y-cut crystal of $LiNbO_3$ for example having optically polished input and output faces 31, 32 at the ends thereof, and optically polished intermediate reflecting surface 33. Interdigited electrodes 28, 28' are engaged with, or at least closely adjacent to, the reflecting surface 33 to couple the electric fringe fields which are created into the electro-optic element 27. Electrodes 28, 28' are coupled across a suitable potential V' through leads 29, 30, application of potential V' to electrodes 28, 28' being controlled in response to the image signal content.

As can be understood, the collimated beam 15 from laser 21 enters the electro-optic element 27 through input face 31 at a grazing angle of incidence relative to the reflecting surface 33. Beam 15 is brought to a wedge shaped focus (by means not shown) at approxmately the longitudinal centerline of the reflecting surface 33 where it is totally internally reflected and exits from the electro-optic element 27 through the output face 32. While passing through the electro-optic element 27, the beam 15 is spatially phase front modulated in accordance with the image signal content.

Differences in potential between electrodes 28, 28' create localized electric fringe fields which penetrate into an interaction region 39 of the electro-optic element 27 to produce a variation in the element's refractive index widthwise of the interaction region. Consequently, as the beam 15 is traversing the interaction region 39, its phase front is sequentially spatially modulated in accordance with the image signal input.

When operated in the Bragg regime (shown in FIG. 3), where there is no phase alteration, light entering the electro-optic element 27 at the Bragg angle $\theta_B$ is undiffracted and emerges as zeroth order beam 15-0. In the example shown, zeroth order beam 15-0 is imaged against a suitable stop 37. Where the voltage V' is applied across the electrodes 28, 28', a phase change occurs and the light is scattered into first order beam 15-1 which as will appear is utilized to expose the recording medium 13.

While a Bragg diffraction regime is illustrated, electro-optic element 27 may be operated in the Raman-Nath regime as will be understood by those skilled in the art. Other modulator types such as acousto-optic, or electro-optic, etc., as well as laser diodes may instead be envisioned. And while first order beam 15-1 serves as the source of scanning beam 15-2, zeroth order beam 15-0 may instead be used. In that circumstance, first order beam 15-1 would be impinged against stop 37.

Deflector 24 comprises a holographic type deflector with a substantially flat scanning disc 46 having a plurality of grating faces or facets 47 around the outer periphery thereof. Scanning disc 46, which is preferably made from glass, is rotated by means of motor 48 in synchronism with movement of drum 14. Preferably, disc 46 is disposed so that the first order beam 15-1 is incident to the facets 47 thereof at an angle of substantially 45°. The diffracted scanning beam 15-2 output by disc 46 exits at a complementary angle.

While a holographic type scanning element has been illustrated and described herein, other scanning element types such as a polygon may be envisioned.

First order beam 15-1 passes through beam expanders 18, 22 and facet tracker 20 to deflector 24, expanders 18, 22 serving to provide controlled expansion to the beam 15-1 to impinge a beam of desired spot size onto facets 47 of scanning disc 46. As will appear more fully herein, facet tracker 20 serves to track the first order beam 15-1 impinging on facets 47 of scanning disc 46 to maintain the beam spot in predetermined position on the facets 47 of scanning disc 46. The first order beam 1 5-1 reflected by facets 47 of scanning disc 46 (referred to herein as scanning beam 15-2) is focused by imaging lens 26 to a selected spot in the focal plane proximate the surface of drum 14.

Figure 5:
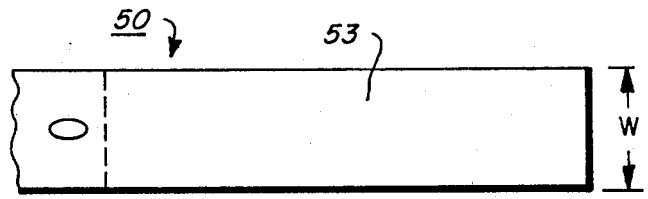
FIG. 5 is a top plan view of the facet tracker shown in FIG. 4.
Figure 4:
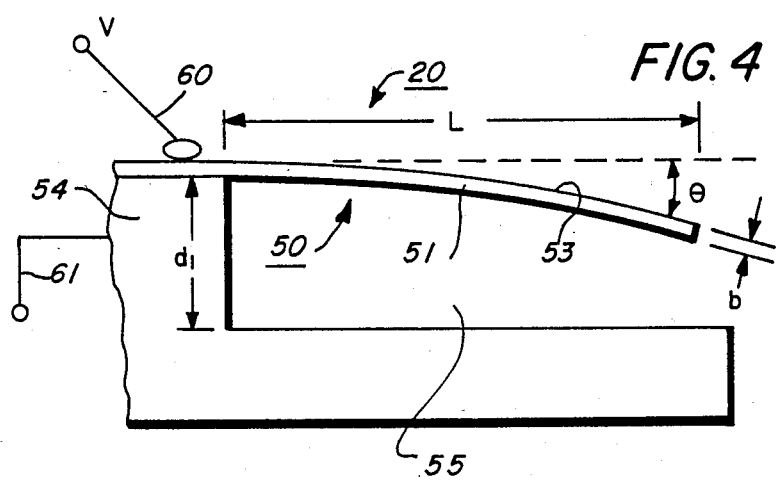
FIG. 4 is an enlarged side view in cross section of the micro-deflector facet tracker of the present invention showing details of the facet tracker construction.

Referring particularly to FIGS. 4 and 5 of the drawings, facet tracker 20 is of the micro-deflector type having a flexible finger 50 preferably comprised of silicon dioxide 51 suitably provided on the surface of a silicon wafer 54 as by deposition, thermal oxidation, etc. Other materials such as silicon, silicon nitride, etc. may be envisioned. A conductive highly reflective mirror-like reflective coating 53 such as chromium is provided on the outer surface of finger 50. The portion of wafer 54 below finger 50 is removed creating a recess or space 55 below finger 50 permitting the free end of finger 50 to deflect as illustrated in FIG. 4. A lead 60 is provided for applying electrical potential to the conductive layer 53 on finger 50 with common or return lead 61 coupled to wafer 54, it being understood that on the application of a bending potential (referred to hereinbelow as V defl), an electrostatic force is created which causes finger 50 to deflect or bend.

The angular deflection $\theta$ required by the flexible finger 50 to track a facet 47 of deflector 24 is given by the following relationship:

(1) $\theta = D/2F$, where

D is the width of a facet 47, and

F is the focal length of the telescope objective lens 22.

For a diffraction limited system, D is related to the spot diameter S at the image plane by the following relationship:

(2) $D = \lambda F'/S$, where $\lambda$ is the light wavelength, $F'$ is the focal length of the focusing lens 26, and S is the spot diameter.

Substituting Equation 2 into Equation 1 provides the following relationship:

(3) $\phi = 2\theta = \lambda F'/SF$, where $\phi$ is the tracking angle.

Equation 3 provides the interrelationship between tracking angle $\phi$, the size of facets 47, the system focal lengths, and image spot size which may be used to determine the system operating parameters required to track the beam 15-1.

Figure 6:
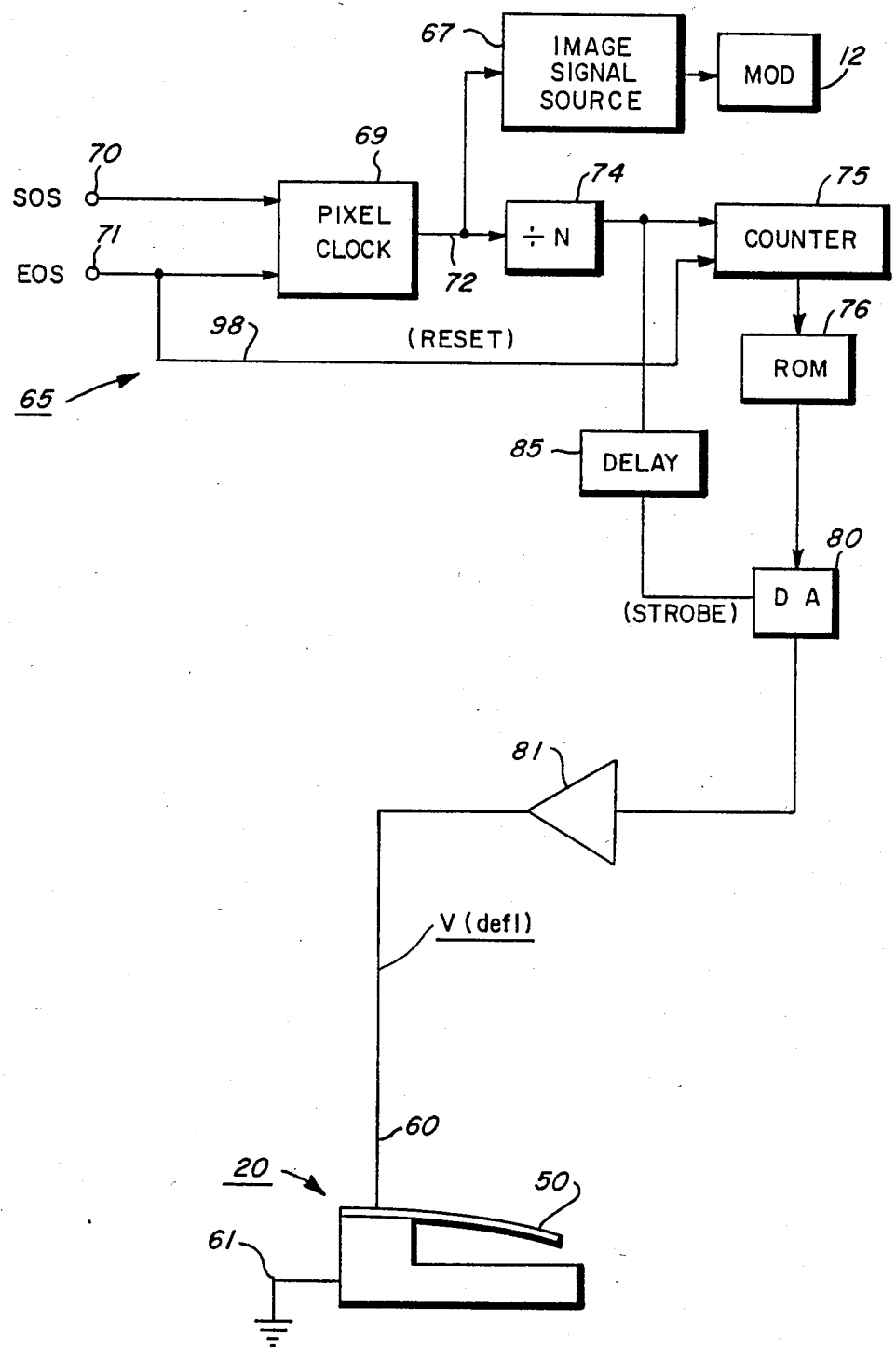
FIG. 6 is a logic diagram showing a control system for operating the micro-deflector facet tracker of the present invention.

Referring to FIG. 6, a control circuit, identified generally by the numeral 65, is provided for applying deflection or bending potentials via lead 60 to finger 50 of micro-deflector facet tracker 20 in synchronization with the rotation of scanning disc 46 and the sweep of scanning beam 15-2 across the photosensitive recording medium 13. A suitable source of image signals 67, which may for example comprise a memory, communication channel, and the like, is provided together with a suitable clock, referred to herein as pixel clock 69, the latter providing clock pulses for clocking the image signals from signal source 67 to modulator 12.

A pair of photocell type sensors, identified herein as Start-Of-Scan (SOS) and End-Of-Scan (EOS) sensors 70, 71 respectively, are provided in the path of scanning beam 15-2 to identify the start and end of the image line on the photosensitive recording medium 13.

The clock pulse output of clock 69 is fed via clock lead 72 to image signal source 67 and to the address counter 75 for a suitable non-volatile memory exemplified here by ROM memory 76 via divide by N counter 74. As indicated, the clock pulse output of pixel clock 69 to image signal source 67 clocks image signals to modulator 12. Modulator 12 in turn modulates beam 15 in synchronism with scanning of the beam 15-2 across the member 13 by deflector 24. The signal output of EOS sensor 71 is applied via line 98 to the reset gate of counter 75 to reset counter 75 preparatory to start of the next scan line.

To enable the position of the spot where first order beam 15-1 impinges on the facets 47 of scanning disc 46 to be controlled throughout the scan, finger 50 of micro-deflector facet tracker 20 is bent or deflected in a controlled manner by application of a potential V (defl) thereto. For this purpose, the output of ROM memory 76 is fed to a suitable digital-to-analog converter 80. The analog signal output of converter 80 is output to an amplifier 81 where the signal is suitably amplified to provide a potential V (defl) sufficient to cause finger 50 to bend or deflect in a controlled manner, the signal output of amplifier 81 being coupled to lead 60 of facet tracker 20. A suitable delay circuit 85 is provided to enable the data input to converter 80 to settle prior to generation of potential V (defl). While a digital based system is illustrated herein, it will be understood that a pure analog control function for applying controlled potentials to finger 50, may instead be used.

The contents of ROM memory 76 are obtained through one or more calibration or test runs made to determine the potential V(defl) required to bend finger 50 by an amount necessary to keep the first order beam 15-1 centered on the facet 47 of scanning disc 46 during scanning. In FIG. 2, the relative positions of the first order beam 15-1 as Start Of Scan (SOS), Center Of Scan (COS) and End Of Scan (EOS) in relation to the deflection of finger 50 of facet tracker 20 are illustrated, it being understood that the positions shown are for example only and are not intended to reflect true positions of beam 15-1.

When the bending potential V(defl) in line 60 is removed from finger 50 of facet tracker 20, finger 50, which can for purposes of explanation be considered as a cantilever beam, returns to the undeflected quiescent state shown by dotted lines in FIG. 4 in preparation for the next scan line.

In one example, a finger 50 of the type described has a length L=160 um, a width w=100 um, a thickness b=2 um, and a depth d=5 um, the finger having a natural frequency of approximately 73 KHz with a Q factor=1.37. A bending potential V (defl) of 51 volts provided maximum bending of approximately 5 degrees (i.e. to the solid line position shown in FIG. 4).

Referring particularly to FIGS. 1, 2, and 4–6, pixel clock 69 is actuated in response to the detection of scanning beam 15-1 by SOS detector 70. The clock pulse output of clock 69 actuates image signal source 67 to output a line of image signals to modulator 12 which modulates the beam 15 in accordance therewith to write an image line across the photosensitive recording medium 13. Concurrently, clock pulses output by pixel clock 69 drive counter 75 which, on reaching predetermined count levels, addresses preset memory locations in ROM 76. The resulting control signal output of ROM 76 to digital to analog converter 80 provides predetermined bending potentials V (defl) to finger 50 of facet tracker 20. Each predetermined bending potential applied to finger 50 causes finger 50 to bend or deflect by a predetermined amount (examples of which are shown in FIG. 2 of the drawings).

As described, finger 50 reflects the first order scanning beam 15-1 through beam expander 22 onto the facets 47 of the rotating scanning disc 46. As finger 50 bends or deflects, the point at which the scanning beam 15-1 impinges on a facet 47 of scanning disc 46 changes so that the position of the beam 15-1 against the facet of the scanning disc is in effect tracked along the facet as the facet moves to thereby maintain the point at which first order scanning beam 15-1 impinges against the facet substantially centered.

As the scanning beam 15-1 reaches the end of the scan line, the beam is detected by EOS sensor 71 and the signal from sensor 71 terminates operation of pixel clock 69 and the input of image signals from image signal source 67 to modulator 12. Concurrently, the signal from EOS sensor 71 in line 98 resets counter 75 to terminate the input of a bending potential V (defl) from amplifier 81 to finger 50. With the bending potential terminated, finger 50 returns to the undeflected position.

While invention has been described with reference to the structure disclosed, it is not confined to the details set forth, but is intended to cover such modifications or changes as may come within the scope of the following claims.

I claim:

1. In a printer having a movable recording member, a beam of high intensity radiation for recording images on said recording member in response to image signals, and a rotatable scanning element having a plurality of facets, said scanning element being interposed in the path of said beam so that said beam impinges against said scanning element facets in succession whereby said beam is repeatedly scanned across the recording member, the combination of:

(a) a facet tracker for tracking said beam to maintain the point where said beam impinges on said scanning element facets substantially fixed, said facet tracker including
    (1) a base;
    (2) an elongated flexible finger on said base, said finger having an unsupported end projecting in cantilever fashion in spaced relation to said base;
    (3) the outer surface of said finger comprising a reflective material, application of an electrical potential across said finger reflective material and said base causing said finger unsupported end to deflect;

(b) said facet tracker being positioned with said finger outer surface in the path of said beam so that said finger reflective material reflects said beam onto the facets of said rotatable scanning element; and (c) means for controlling said electrical potential to cause said finger unsupported end to deflect in synchronism with movement of each successive scanning element facet so as to displace said beam and maintain the point where said beam impinges on said scanning element facets substantially constant.

2. The printer according to claim 1 in which said controlling means includes means to remove said electrical potential between scans to permit said finger unsupported end to return to a non-deflected position prior to the next scan.

3. The printer according to claim 1 in which said controlling means progressively increases said electrical potential to increase bending of said finger unsupported end progressively.

4. The printer according to claim 3 in which said controlling means includes means to remove said electrical potential between scans to permit said finger unsupported end to return to a non-deflected position prior to the next scan.

5. A facet tracker for use in tracking a beam of high intensity radiation to maintain the point where the beam impinges on each facet of a rotating multi-faceted scanning element substantially stationary as the scanning element rotates and the facet moves therepast, comprising:

(a) a base;

(b) a flexible finger-like projection on said base bendable toward and away from said base;

(c) the outer surface of said finger-like projection having a reflective material for reflecting the beam onto each facet of said scanning element on disposition of the facet tracker finger-like projection in the path of the beam upstream of the scanning element;

said finger-like projection being adapted to bend in response to application of an electrical bending potential thereto so that the point at which the reflected beam impinges on each facet of said scanning element can be moved by application of controlled electric bending potentials to said finger-like projection to bend said finger-like projection and track said beam to maintain the point where the beam impinges on each facet of said scanning element substantially stationary.

6. The facet tracker according to claim 5 in which said reflective material comprises an electrically conductive coating;

said base being composed of a relatively less conductive material whereby on application of an electrical potential thereacross, an electrostatic force is created to cause said finger-like projection to bend.

7. A facet tracker for use in tracking a beam of high intensity radiation to maintain the point where the beam impinges on the facets of a rotating scanning element substantially constant, comprising:

(a) a generally rectangular base having a recess; and (b) an elongated flexible reflector element projecting above said recess for reflecting said beam, said recess permitting said reflector element to bend on application of an electrical potential thereto so that by applying controlled electrical potentials to the reflector element, the point at which the beam impinges on the scanning element facets may be displaced concurrently with movement of the facets whereby the beam is tracked and held in substantially constant location on the scanning element facets.

* * * * *